United States Patent
Fonseca E Costa et al.

(10) Patent No.: US 9,996,537 B2
(45) Date of Patent: Jun. 12, 2018

(54) SYSTEMS AND METHODS FOR AUTOMATIC NARRATIVE CREATION

(71) Applicant: Nativo, Tomar (PT)

(72) Inventors: Manuel Ricardo Fonseca E Costa, Lisbon (PT); Leonel Filipe Luis Duarte, Lisbon (PT); Filipe Manuel De Vasconcelos Carvalho Da Costa, Lisbon (PT)

(73) Assignee: StoryMatik Software, S.A. (PT)

( * ) Notice: Subject to any disclaimer, the term of this patent is extended or adjusted under 35 U.S.C. 154(b) by 469 days.

(21) Appl. No.: 14/742,560

(22) Filed: Jun. 17, 2015

(65) Prior Publication Data

US 2015/0370888 A1    Dec. 24, 2015

Related U.S. Application Data

(60) Provisional application No. 62/014,403, filed on Jun. 19, 2014.

(51) Int. Cl.
   *G06F 17/30* (2006.01)
(52) U.S. Cl.
   CPC .............. *G06F 17/30056* (2013.01)
(58) Field of Classification Search
   CPC .................................. G06F 17/30056
   See application file for complete search history.

(56) References Cited

U.S. PATENT DOCUMENTS

| | | | | |
|---|---|---|---|---|
| 7,886,228 B2* | 2/2011 | Balabanovic | ..... | G06F 17/30056 382/305 |
| 2004/0059996 A1* | 3/2004 | Fasciano | .......... | G06F 17/30274 715/202 |
| 2008/0010601 A1* | 1/2008 | Dachs | .................... | G06Q 10/10 715/751 |
| 2011/0270889 A1* | 11/2011 | Stevens | ............. | G06F 17/30029 707/797 |
| 2011/0306026 A1* | 12/2011 | Scholler | ................... | G09B 5/00 434/317 |
| 2012/0005209 A1* | 1/2012 | Rinearson | ......... | G06F 17/30908 707/737 |
| 2013/0198602 A1* | 8/2013 | Kokemohr | ........ | G06F 17/30011 715/233 |
| 2014/0172856 A1* | 6/2014 | Imbruce | ................ | G06F 17/212 707/737 |
| 2017/0164021 A1* | 6/2017 | Imbruce | ........... | H04N 21/23424 |

* cited by examiner

*Primary Examiner* — Jared M Bibbee
(74) *Attorney, Agent, or Firm* — Eric L. Sophir; Dentons US LLP

(57) ABSTRACT

A clustering module in communication with a processor and a memory may be configured to receive a dataset comprising a plurality of media elements each comprising metadata and organize the plurality of media elements into a plurality of clusters based on the metadata, the plurality of clusters being organized into a clustering tree. A narrative module in communication with the processor and the memory may be configured to create a narrative comprising a plurality of the media elements arranged into a narrative sequence, the narrative sequence being structured according to the clustering tree and for a predetermined duration, thereby transforming media elements into a narrative.

30 Claims, 8 Drawing Sheets

SYSTEMS AND METHODS FOR AUTOMATIC NARRATIVE CREATION

CROSS-REFERENCE TO RELATED APPLICATION

This application is based on and obtains the benefit of the filing date of U.S. Provisional Application No. 62/014,403, filed Jun. 19, 2014, the contents of which are incorporated herein by reference in their entirety.

DETAILED DESCRIPTION OF SEVERAL EMBODIMENTS

Figure 1:
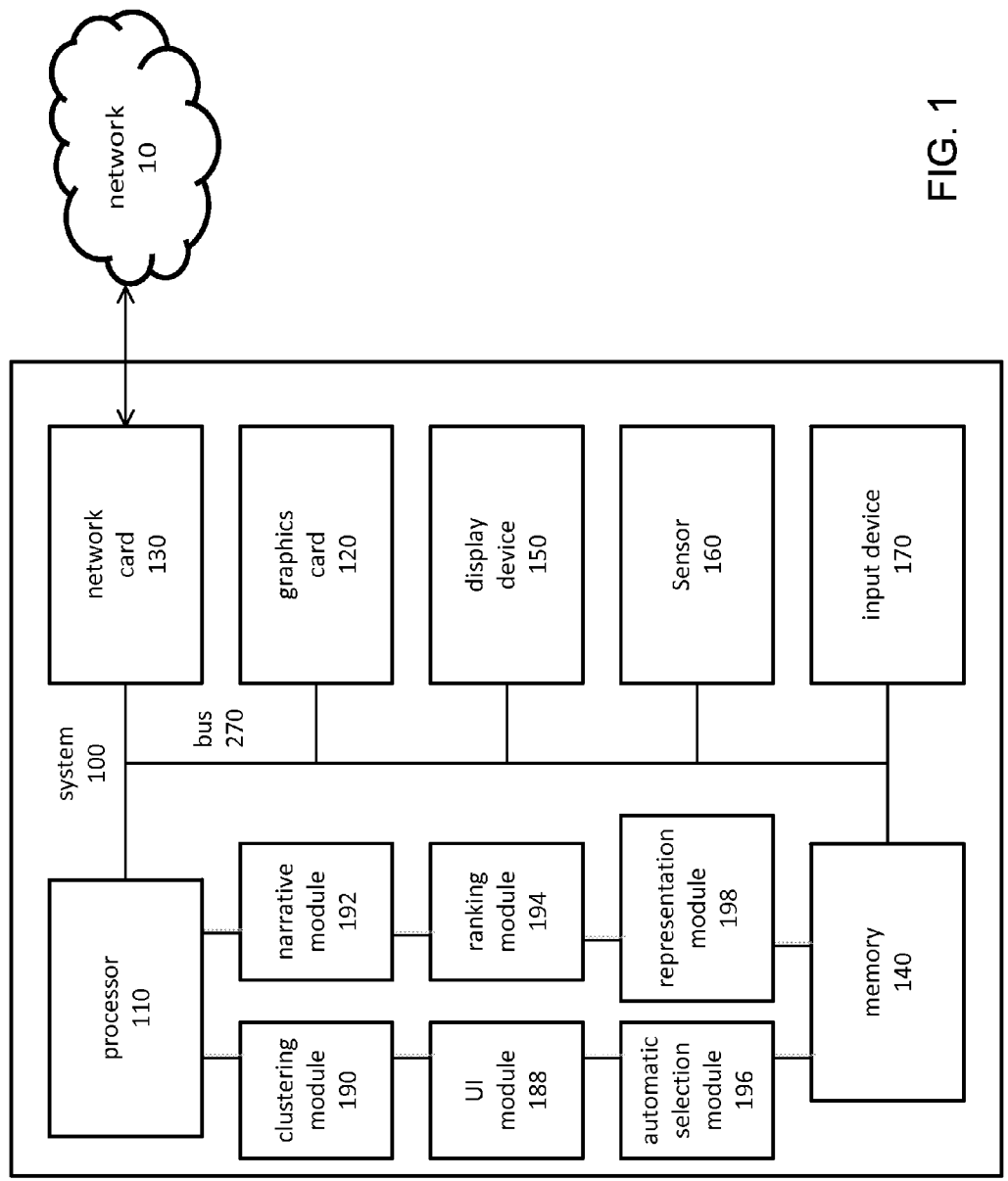
FIG. 1 is a narrative creation system according to an embodiment of the invention.

Systems and methods described herein may provide automated storytelling through data organization and data visualization. Photos may be organized based on space and time and that organization may be used to create a narrative. For example, photo meta-information space (latitude/longitude) and time may be used to produce a coherent structure to be organized in a timeline for a given representation time. The animation of the timeline may be a form of data visualization. The narrative creation may be facilitated by features such as a clustering method based on at least three variables (time, latitude, and longitude) that may organize photos with either a timeline creation as a goal or to track coherent stories automatically from a given set of photos. Additionally, timeline creation/animation algorithms for a given representation time that use a clustering tree as the skeleton for the timeline may be provided.

For example, a system may automatically build stories without user intervention by applying a plurality of filters to define a dataset for a trial story. If dataset is accepted, a trial narrative skeleton may be built by applying a clustering algorithm that organizes groups in a tree. If the tree is accepted, a timeline for a specific duration may be built, and photos may be selected according to their ranking. Created narratives may be viewed and/or shared by users. For example, the narratives may be used in digital picture frames running on a computer device that execute auto-generated stories and/or load stories saved by the user on a shared media folder. The narratives may be used in Smart TVs that execute auto-generated stories and/or load stories saved by the user on a shared media folder. The narratives may be used in screen savers running on a computer device that executes auto generated stories and/or loads stories saved by the user on a shared media folder. Virtually any display device and computer system may be used to display created narratives.

Systems and methods providing these and other features may comprise one or more computers, which may also be referred to as processors. A computer may be any programmable machine or machines capable of performing arithmetic and/or logical operations. In some embodiments, computers may comprise processors, memories, data storage devices, and/or other commonly known or novel components. These components may be connected physically or through network or wireless links. Computers may also comprise software that may direct the operations of the aforementioned components. Computers may be referred to with terms that are commonly used by those of ordinary skill in the relevant arts, such as servers, PCs, mobile devices, routers, switches, data centers, distributed computers, and other terms. Computers may facilitate communications between users and/or other computers, may provide databases, may perform analysis and/or transformation of data, and/or perform other functions. In some embodiments, the computers used in the described systems and methods may be special purpose computers configured specifically for automated storytelling. For example, a device may be equipped with specialized sensors, processors, memory, communication components, etc. that are configured to work together to capture any and all data necessary to gather media and automatically form a narrative from the media.

Computers may be linked to one another via a network or networks. A network may be any plurality of completely or partially interconnected computers wherein some or all of the computers are able to communicate with one another. It will be understood by those of ordinary skill that connections between computers may be wired in some cases (e.g., via Ethernet, coaxial, optical, or other wired connection) or may be wireless (e.g., via Wi-Fi, WiMAX, or other wireless connection). Connections between computers may use any protocols, including connection-oriented protocols such as TCP or connectionless protocols such as UDP. Any connection through which at least two computers may exchange data can be the basis of a network. In some embodiments, specialized networks and/or communication techniques may be employed by the described systems and methods to gather data (e.g., media and/or narrative information) and share automatically generated narratives.

FIG. 1 is a narrative creation system 100 according to an embodiment of the invention. System 100 may comprise a processor 110, a graphics card 120, a network card or any other hardware that allows network access 130, memory 140, a screen or other display device 150, a camera or other sensor for capturing media 160, input device (e.g., keyboard, mouse, touchscreen, etc.) 170, and/or a bus 180. Photos and/or complementary data such as maps or social network activity used to enrich storytelling may be pulled from remote computers via the Internet or another network 10 using the network card 130. Additionally, photos and/or complimentary data may be captured locally using the camera 160 and/or input device 170.

Additionally, system 100 may include a plurality of special purpose modules configured to cause the system 100 components to function as a special purpose computer for performing the automatic narrative creation functions described herein. For example, these modules may include a clustering module 190, a narrative module 192, a ranking module 194, a user interface (UI) module 188, an automatic selection module 196, and/or a representation module 198. The modules may comprise software that uses processor 110 and/or graphics card 120 to produce a video animation. The clustering module 190 may analyze photo meta-information (e.g., date taken and geographic information (Latitude and Longitude)) and organize photos in a tree. Applying a clustering algorithm to these variables may generate the tree. The clustering module 190 may apply the clustering algorithm recursively to each cluster dataset until one or more stop criteria are met. The narrative module 192 may generate a timeline for a specified duration using the tree as the driving structure of the narrative. The narrative module 192 may use complementary information that can be referenced in space and time like maps, weather information, social network activity, and/or calendar events. The ranking module 194 may rank photos to provide an automatic photo selection based on the ranking. The representation module 198 may translate the selected photos and narrative into a visual representation. The automatic selection module 196 may perform automatic (as opposed to user-driven) selection of items for inclusion in a narrative. Together, these modules may transform media data (e.g., photos) into narratives. Transforming the media data into narratives may enhance data storage and/or organizational efficiency of the data. Transforming the media data into narratives may also result in the creation of narratives that may be more easily shared, transmitted, and/or displayed by a computer system than the raw media data. The following description explains in further detail how the modules may transform the media data into narratives according to some embodiments.

Clustering

A dataset (e.g., a set of photos) may be defined either via user selection or automatically. User selection of photos and automatic selection of photos are both described in greater detail below. After a dataset is defined in either automatic or user created stories, clustering module 190 may use a clustering method (e.g., a nonparametric clustering technique which does not require prior knowledge of the number of clusters and does not constrain the shape of the clusters, such as the well-known mean shift algorithm) to segment data based on photo meta-information time, latitude, and longitude. The clustering module 190 may start by applying a first segmentation step through the clustering of photo meta-information time, latitude and longitude. Resulting segments may be classified in four possible categories according to their isolation type:

Time—when the produced clusters are isolated in time, but not in space. For example, a latitude and longitude bounding box may be intercepted in at least two of the produced clusters, which means that both clusters share a common geographic area. For example, if a first cluster is confined to a US bounding box and a second cluster is confined to Washington, D.C., the two clusters are intercepted.

Space—when the produced clusters are isolated in space (Long, Lat), but not in time;

Space/Time—if clustering produces a sequence of clusters that may be organized so that consecutive clusters are isolated in space and time. For example, a traveller may take a set of pictures at the airport, travel to a different continent and take another set of pictures, and return through the same airport and take a final set of pictures, Miscellaneous—when there are at least two clusters intercepted in space and two intercepted in time.

In each of the produced clusters, the same clustering method may be applied again to their children, until the clustering method ceases to divide data or some stop criteria is met (e.g., dataset has a geographic bounding box below some threshold). In some embodiments, some rules may be set while defining the partitioning strategy to build the tree. Two examples will now be given.

EXAMPLE 1

A given cluster may be produced from a division that created clusters isolated in time. Clustering module 190 may determine whether the clustering step of the cluster dataset should be carried out based on time and space. This may vary according to the goal of the clustering tree. If the tree is to be used to create a story narrative, clustering its data may be carried out based on time only. Organizing data by geography after a division by time might create a skeleton for a narrative that confuses the user. If the clustering tree is to be used to find stories, though, this may be less relevant, and forcing subsequent clustering steps to be segmented based on time only might cause loss of important data variability and, consequently, loss of story tracking capacity.

EXAMPLE 2

After applying clustering to a given cluster dataset produced by the segmentation process, several new segments may be produced with an isolation following the category Miscellaneous. This means that one segment may have a cluster isolated in time from the others and another cluster isolated in space. These isolations may be mathematical abstractions and, in this situation, the isolations may be rejected for both narrative creation and story tracking, and the original dataset may be re-clustered based on Time variable only.

As in these two examples, some embodiments may first use a clustering process to produce a Time isolation type and then use a different segmentation strategy in child clusters that were obtained by the clustering process that produced the Time isolation type. Some examples of different strategies may include the following:

User Stories—If the clustering tree is to be used in User generated stories, this strategy may force subsequent segmentations to be exclusively based on the time variable.

Automatic Stories—If the clustering tree is to be used as the foundation to track stories, subsequent segmentations may be carried out based on the three variables (time, latitude, longitude).

User and Automatic Stories—Miscellaneous segmentations may be considered invalid, and if a clustering process of a given node dataset produces a miscellaneous isolation type, it may be re-clustered based exclusively on time variable.

Cluster node index may be formalized as follows:

$Node_{1,k_1, \ldots, k_{e-1},k_e}$—represents a node of level e and that belongs to the following chain $Node_1 \rightarrow Node_{1,k_1} \rightarrow \ldots \rightarrow Node_{1,k_1, \ldots, k_{e-1}} \rightarrow Node_{1,k_1, \ldots, k_{e-1},k_e}$ of the Clustering Tree $Node_1$ represents the entire photo dataset, $Node_{1,k_1}$ represents a segment obtained by applying the clustering algorithm to $Node_1$ dataset and $Node_{1,k_1, \ldots, k_{e-1},k_e}$ by applying it to the dataset $Node_{1,k_1, \ldots, k_{e-1}}$. Assuming that it has no children, $Node_{1,k_1, \ldots, k_{e-1},k_e}$ represents a Leaf Node.

Figure 8:
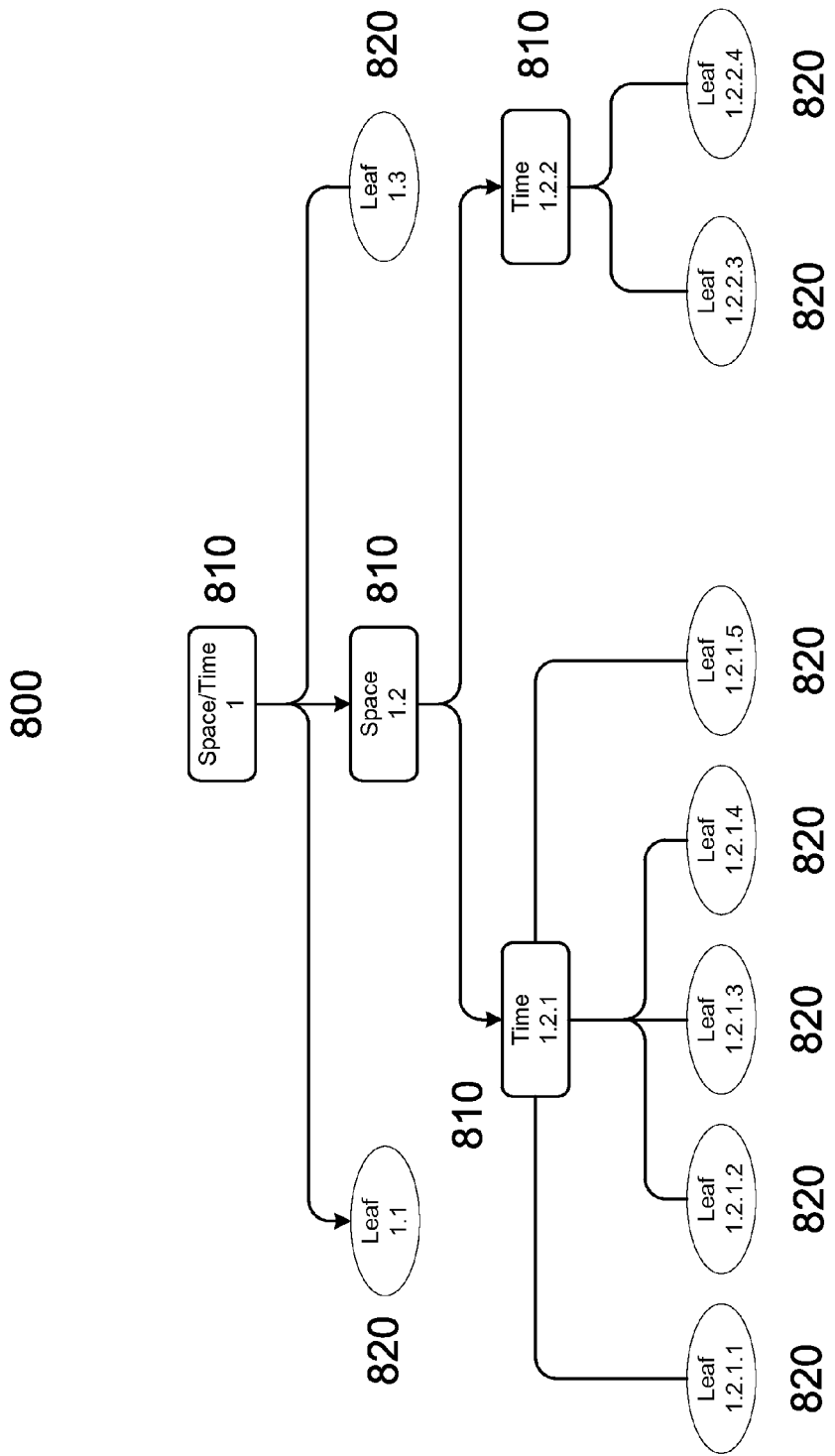
FIG. 8 is a clustering tree according to an embodiment of the invention.

FIG. 8 is a clustering tree 800 according to an embodiment of the invention. A clustering tree 800 may be a result of running the clustering algorithm described above. Each node 810, 820 may be a set of one or more photos. Clusters that may not be further divided may be leaf nodes 820, and clusters from which at least two other nodes are divided may be branch nodes 810. The specific content of the nodes in FIG. 8 is described in the context of the illustrative example presented below.

Timeline Creation

After clustering module 190 defines a clustering tree for a given set of photos, narrative module 192 may create a timeline for a specific duration. Narrative module 192 may use the clustering tree to tentatively and recursively distribute representation time down the child nodes. This process may occur for both user-generated and automatic dataset selections.

Definitions

The following set of definitions may be useful in defining an algorithm used by the narrative module 192.

A Timeline may be organized in entries, and the clustering module 190 may assume the following entry types in some embodiments:

Story Introduction—used to introduce the story narrative
Geographic Introduction—used to contextualize a cluster node in space
Time Introduction—used to represent cluster node period
Show of Photos—which represents a set of photos
Story End—end of story representation In some embodiments, a Chapter (C) may be a representation of a non leaf node (final node) of the Clustering Tree and may comprise:

Chapter Introduction (CI)—which may be a Time Introduction, a Geographic Introduction, or a sequence of both
Chapter Body (CB)—which may be represented by a Show of Photos Chapter Introductions may have a variable sequence according to the isolation type of the associated node as follows:

Space/Time—Time Introduction, Geographic Introduction
Space—Geographic Introduction
Time—Time Introduction Show of Photos may be mandatory and Time Introduction and Geographic Introductions may be optional in some embodiments.

A chapter may delegate its chapter body animation to its children nodes, which may be classified as sub-chapters. These sub-chapters may have exactly the same properties as a chapter, which means that they may also delegate their body representation to their children.

Stories may be classified based on the clustering tree first node isolation type and may assume the same name as the isolation type. This classification may be used to define how entries are represented.

In the timeline creation, the algorithm used by narrative module 192 may assume that story introduction and story end are always present at the beginning and end of the narrative, respectively. In the specific case of time stories, story introduction may be followed by a geographic introduction of the entire dataset.

Story Introductions may have a fixed duration and a geographic introduction and time introduction, if present. Geographic introduction and time introduction may have a variable number of instances according to the clustering tree and according to the duration specified to represent the story.

Time given to represent a photo may be constant, but if some criteria to represent a specific Show of Photos are met, each photo duration may be changed to a fixed fraction, and the number of photos to represent may grow proportionally.

Narrative module 192 may make an initial estimate for Story End duration and may associate a minimum duration for Show of Photos photo representation. Thus, the following constants are defined:

SI=Story Introduction animation duration
GI=Geographic Introduction duration
TI=Time Introduction duration
$P_{min}$=Minimum duration to show a photo
$SE_{Guess}$=Story End animation desired duration
N=total number of photos in the dataset
T=Total duration of the story (user specified value or forced in automatic stories)
where $$T > SI + GI + TI + P_{Min} + SE_{Guess} \quad (\text{EQ. 1})$$

For a given story duration T, a timeline may be created with two steps. A first step may represent an initial guess of the narrative, and a second iterative step may attempt to delegate chapter body representations to their children recursively. A timeline may be created in each iteration. However, the total number of photos available might not be enough to fulfill a given story duration T. This may be solved by assuming that photo duration does not have a fixed value. Photo duration may simply have a minimum duration.

To guarantee that the generated timeline has exactly T time, a final correction of possible time truncation errors may be performed, and Story End animation duration may be assumed to perform these adjustments. Thus, the following variables may be computed as new trial timelines are generated:

P=Duration to show a photo
SE=Story End animation duration

First Iteration

A minimum representation of a story may include an Introduction, a Geographic Introduction, a photo slide show, and End Animation. The total duration may be a given value and, thus, it may be possible to define the following relation:

$$SI + GI + TI + nP + SE = T \quad (\text{EQ. 2})$$

where,
n=total number of photos in the slide show

Total number of photos may be calculated by assuming $P = P_{Min}$ and $SE = SE_{Guess}$. Given that each photo is only represented once, n<=N and thus n is given by:

$$n = \text{Min}(N, \text{Floor}(T - (SI + GI + TI + SE_{Guess})/P_{Min})) \quad (\text{EQ. 3})$$

If $SI + GI + TI + nP\_Min + SE\_Guess < T$ then $$P = (T - (SI + GI + TI + SE\_Guess))/n \quad (\text{EQ. 4})$$

Finally, to correct possible truncation errors $$SE = T - (SI + GI + TI + nP) \quad (\text{EQ. 5})$$

Second Iteration and Subsequent Recursive Iterations

After the first iteration, narrative module 192 may tentatively delegate Chapter Body animation representing the entire dataset of photos to its associated cluster node children with a duration of nP time units. Assuming that Chapter clustering node has k children, the following relation may be defined:

$$C_{1,1} + C_{1,2} + \ldots + C_{1,k} = nP \quad (\text{EQ. 6})$$

where
$C_{1,j}$=Chapter duration associated with cluster node 1,j

The duration of the candidates Sub-Chapters may be given by any arbitrary criteria. For example, if the criteria is number of photos in each child cluster, the duration of each Sub-Chapter may be given by the ratio of photos present in the associated cluster relative to the total number of photos. Time division criteria will be explained in greater detail below. For now it may be assumed that $C_{1,j}$ is a given value. The representation of each Chapter may vary according to the type of isolation. The duration of each animation entry may be represented by the generic equation:

$$GI+TI+(n_{1,j})P=C_{1,j} \qquad (EQ. 7)$$

where $n_{1,j}$—Chapter $C_{1,j}$ number of photos

If one or more of the introduction entries do not exist, its time may be set to 0 time units. Now narrative module 192 may calculate the number of photos to be shown in each Sub-Chapter. This may be carried out by assuming again $P=P_{Min}$ and thus:

$$n_{1,j}=Min(N_{1,j},Floor((C_{1,j}-(GI+TI))/P_{Min}) \qquad (EQ. 8)$$

where $N_{1,j}$—total number of photos associated with cluster node 1,j

To accept this timeline the following condition may be verified $n_{1,j}>c$, where c—minimum number of photos per Chapter If the timeline is accepted, photo duration P may be calculated according to formula $$P=(T-(SI+(GI+TI)+k(GI+TI)+SE\_Guess))/(\Sigma\_(i=1)n\_ (1,i)) \qquad (EQ. 9)$$

and SE may be given by $$SE=T-(SI+(GI+TI)+\Sigma_{i=1}(GI+TI+(n_{1,i})P)) \qquad (EQ. 10)$$

If the timeline is accepted, this process may be applied again to each Sub-Chapter independently, and a new timeline may be generated if at least one process produces a successful delegation.

Sub-Chapters-Distribution of Time

When a Chapter tentatively delegates animation to its children, narrative module 192 may decide how to divide the available time. Several criteria may be used, and for illustrative purposes six non-limiting examples are provided as follows:

Time division is proportional to the number of photos associated with each child;

Time division is proportional to the number of leaf nodes existent in the tree below each node. This may be a metric of the variability of moments associated with a Chapter and, therefore, a measure of relevance Time division is proportional to the number of photos with faces detected Time division is proportional to a social activity associated with a photo such as, for example, the number of likes or the number of comments;

Time division is proportional to any other continuous or categorical variable that can be related in space and time with each node such as, for example, weather temperature, humidity, precipitation;

A weighted average of any combination of the previous criteria.

Independently of the criteria used, the algorithm to distribute time may also assume that a minimum number of photos is required to represent a Sub-Chapter. For example, minimum number of photos per child Sub-Chapter may be given by:

$$n_{Min1}=Min(Floor(n_1/k),n_{MinTarget}) \qquad (EQ. 11)$$

where $n_1$—total number of photos present in first node of the tree (entire dataset)

$n_{Min1}$—minimum number of photos required to represent the Body of Sub-Chapter 1,j k—number of Sub-Chapter 1 children Narrative module 192 next may calculate the number of photos that will be represented in each Sub-Chapter. Assume $W_{1,j}$—weight of Sub-Chapter 1,j and $$W_{1,1}+W_{1,2}+ \ldots +W_{1,k}=1 \qquad (EQ. 12)$$

To calculate the number of photos in each Sub-Chapter, narrative module 192 may order weights from largest to smallest producing the following ordered vector:

$$W_{ord1,1},W_{ord1,2}, \ldots ,W_{ord1,k} \qquad (EQ. 13)$$

Next, narrative module 192 may execute a well-known algorithm such as the D'Hondt method of proportional allocation to calculate the number of photos in each Sub-Cluster based on weights.

Finally, narrative module 192 may calculate the duration of each Sub-Chapter, which may be given by:

$$C_{1,i}=GI+TI+n_{1,i}P_{Min} \qquad (EQ. 14)$$

Photo Selection

Figure 7:
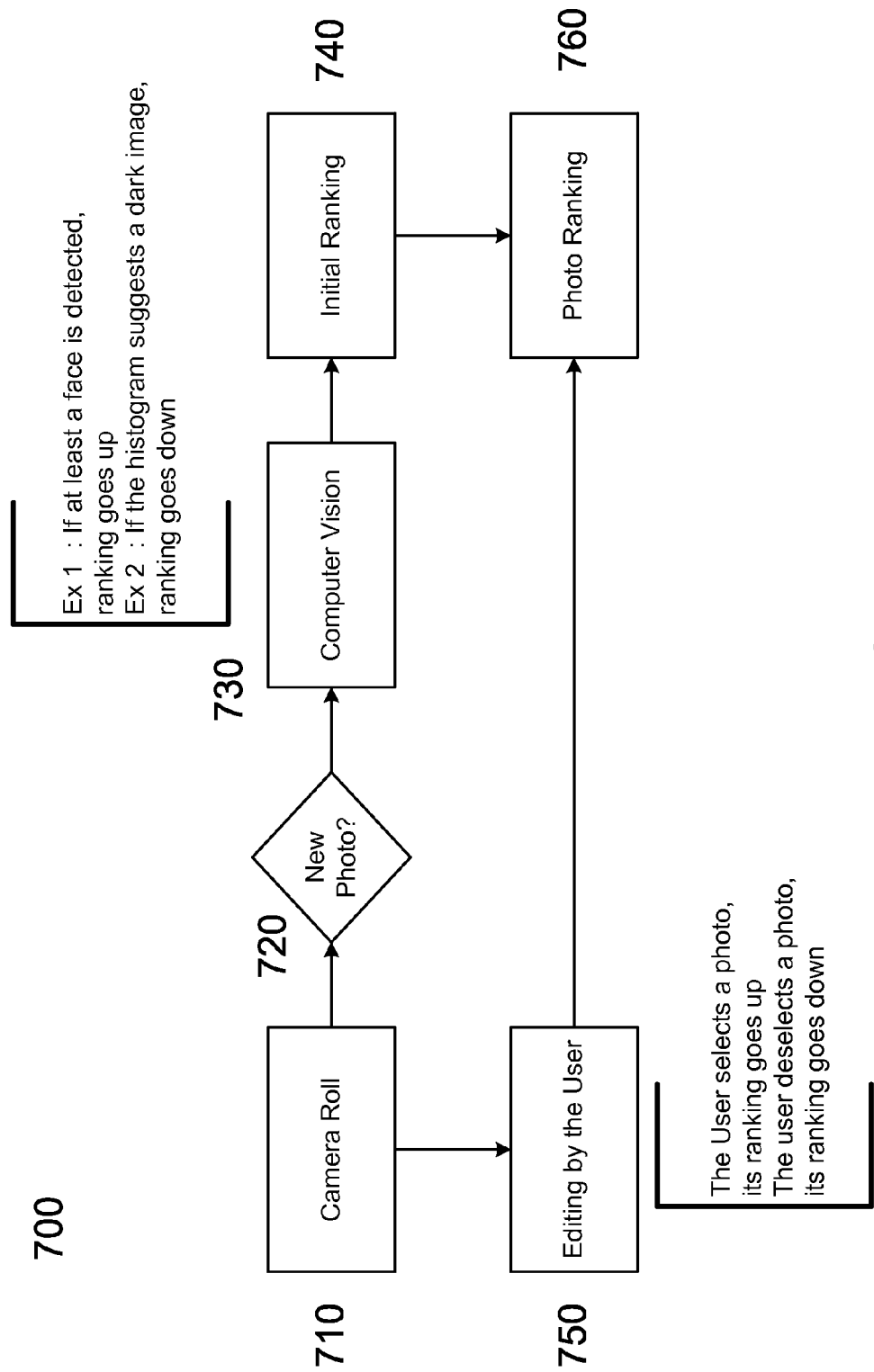
FIG. 7 is a photo ranking method according to an embodiment of the invention.

The final step to create a timeline may be to select photos. Ranking module 194 may probabilistically select photos based on a ranking. FIG. 7 is a photo ranking method 700 according to an embodiment of the invention. A photo set may be selected 710. When a new photo is added to the photo set 720 (and or during initial formation of the photo set, when all photos are new), ranking module 194 may apply computer vision algorithms such as face tracking or histogram analysis 730 to compute an initial ranking 740. For example, if a photo has a face detected, its initial ranking may go up by a predefined amount, and if an image has a low spectrum in its histogram analysis, its ranking may go down.

In user-generated stories, the user may select the set of photos, and photos within that group may be selected automatically by ranking module 194. After viewing a full or partial story, the user may be able to change photos in each entry of type show of photos via the UI 750. When a photo is selected by the user, its ranking may go up by a predefined amount, and when a photo is deselected by the user, its ranking may go down.

In either case, whether the ranking is automatically generated or user generated, once determined, the ranking for each photo may be saved as the final photo ranking 760.

Timeline Representation

After a timeline is created, representation module 198 may define how the timeline will be represented in the final video-story in order to effectively convey the desired narrative. In some embodiments, it may be assumed that animation representation can use any source of data and fetch any visual asset that can be matched with the meta-information (date taken, latitude, and longitude) in order to be used to enrich and convey the desired narrative.

Representation module 198 may identify external data and assets that may be used to help convey the narrative by illustrating the meta-information (e.g., maps or location names), to contextualize the photos in their geographic or time context (e.g., weather information, calendar events such as national holidays), and/or the user's personal activity during the timeframe of the photos (e.g., social networks activity, messaging, or any other activity that can be traced down to a specific time or location for the photo). Representation module 198 may combine and assemble the timeline and external data and assets in a way that fits the linear nature of the final video-story format in order to achieve an interesting and effective narrative.

Representation module 198 may assemble the final video-story by adding text elements for the narrative to be understood as a particular story such as the initial title, chapter titles, and photo labels. Representation module 198 may create opening titles by intercepting the photos' meta-information (date taken, latitude, and longitude), type of story (time story, space story, or space-time story), and/or any user preferences (show dates or not, show location or not, etc.).

Representation may depend on the entry type and also on the sequence of entries in the timeline. For example, the timeline creation algorithm may produce the following timeline from Table 1:

TABLE 1

Illustrative timeline

Story Introduction
Geographic Introduction
Geographic Introduction of Chapter 1
Show of Photos
Geographic Introduction of Chapter 2
Show of Photos
Story End Story Introduction may be represented with a title based on most frequent locations present in Chapter 1 and 2 in this example. Geographic introduction may be represented by a map with geographic boundaries defined by the geographic coordinates of the entire dataset of photos, which may be pulled from a public online service, for example. Geographic Introductions of Chapter 1 and Chapter 2 may also include a map as the main representation unit. Again the maps may be obtained from a public online service. Because Geographic Introduction Chapter 1 may be preceded by a map representing a broader geographic area, and because it may necessarily represent a geographic portion of the first map, a zoom animation may be used to transition from the overall Geographic Introduction map to the Geographic Introduction Chapter 1 map. Show of Photos may represent a slide show of photos that may receive an overlay emphasizing possible extreme weather events (e.g., temperature above 41° C., notable storm, etc.) for the average location of the Chapter. This information may be obtained by matching both geographic and time information with external services (e.g., public online weather services).

After a story is built, whether the data set is user-generated or automatically selected, the story may be shown to the user via the UI. The user may be able to approve the story, which may cause the story to be saved in device 100 memory, or the user may reject the story, which may cause the story to be discarded.

User Selection of Dataset

In some embodiments, UI module 188 may provide a UI allowing a user to select a dataset of any size by selecting first and last photos. The dataset may be used to define duration for the story narrative and an animation theme. This theme may represent how the timeline is animated and which external assets are used (e.g., which external source of maps will be applied). When the user presses next, UI module 188 may prompt the other modules to generate a timeline for the specified duration according to the methods disclosed herein. This timeline may comprise entries (e.g., introduction, map, calendar, show of photos, and end).

Introduction and end entries may be used to introduce and terminate the story, respectively. Map entries may be used to geo-reference photos. Calendar entries may be used to emphasize when there are time discontinuities between sets of photos taken. Finally, show of photos entries may be used to represent a specific set of photos.

Figure 2:
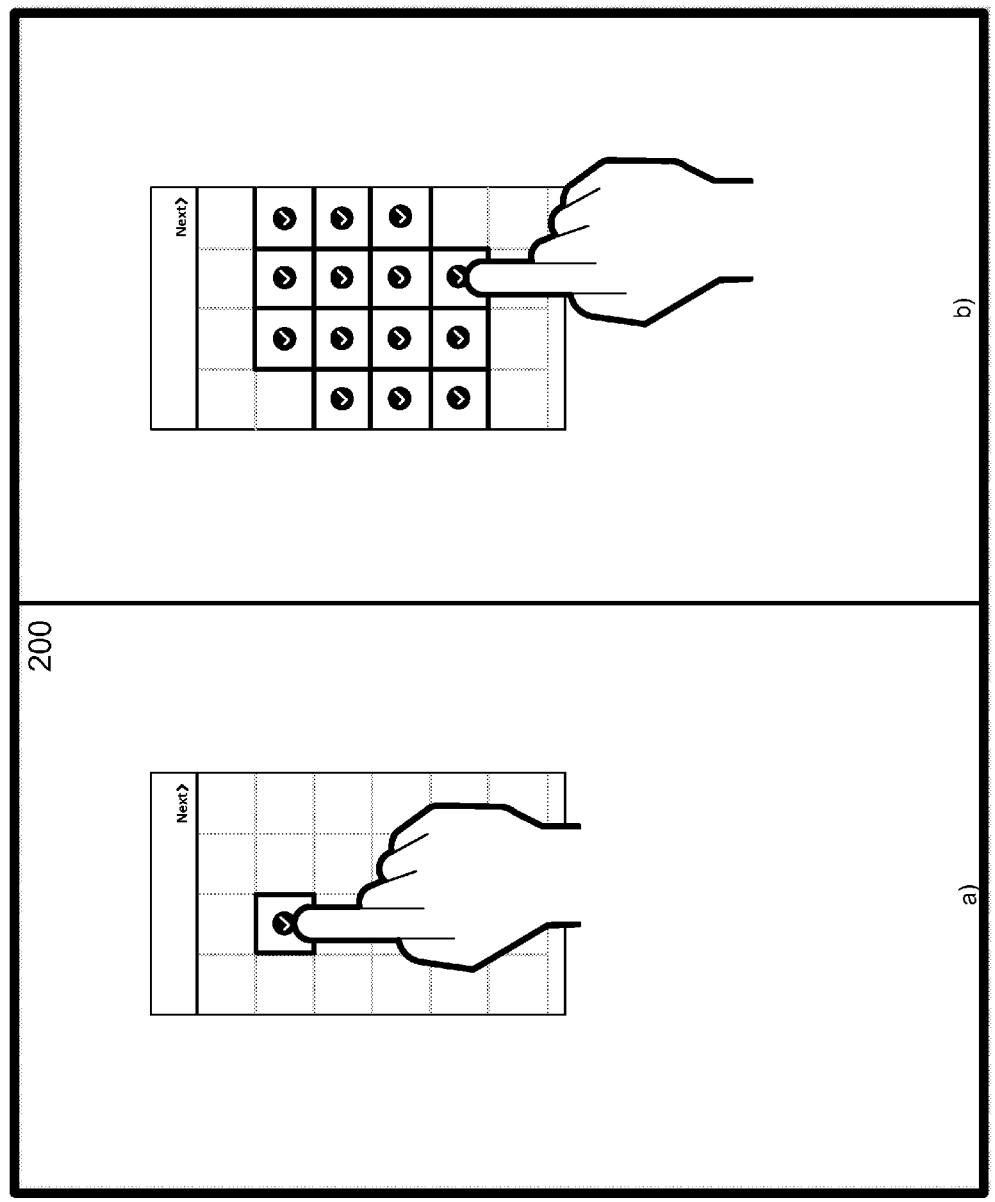
FIG. 2 is a photo selection method according to an embodiment of the invention.
Figure 3:
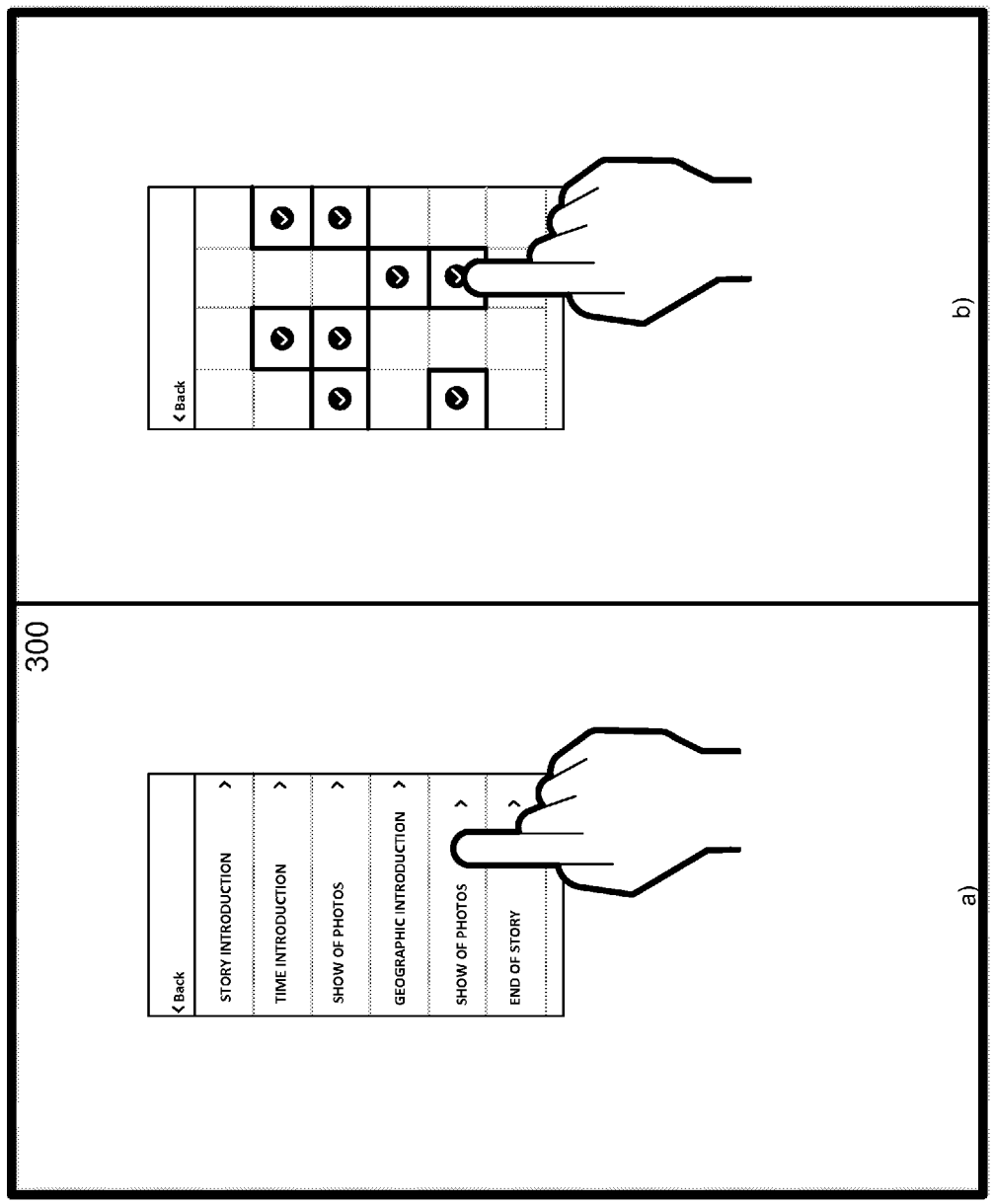
FIG. 3 is a narrative timeline editing method according to an embodiment of the invention.
Figure 4:
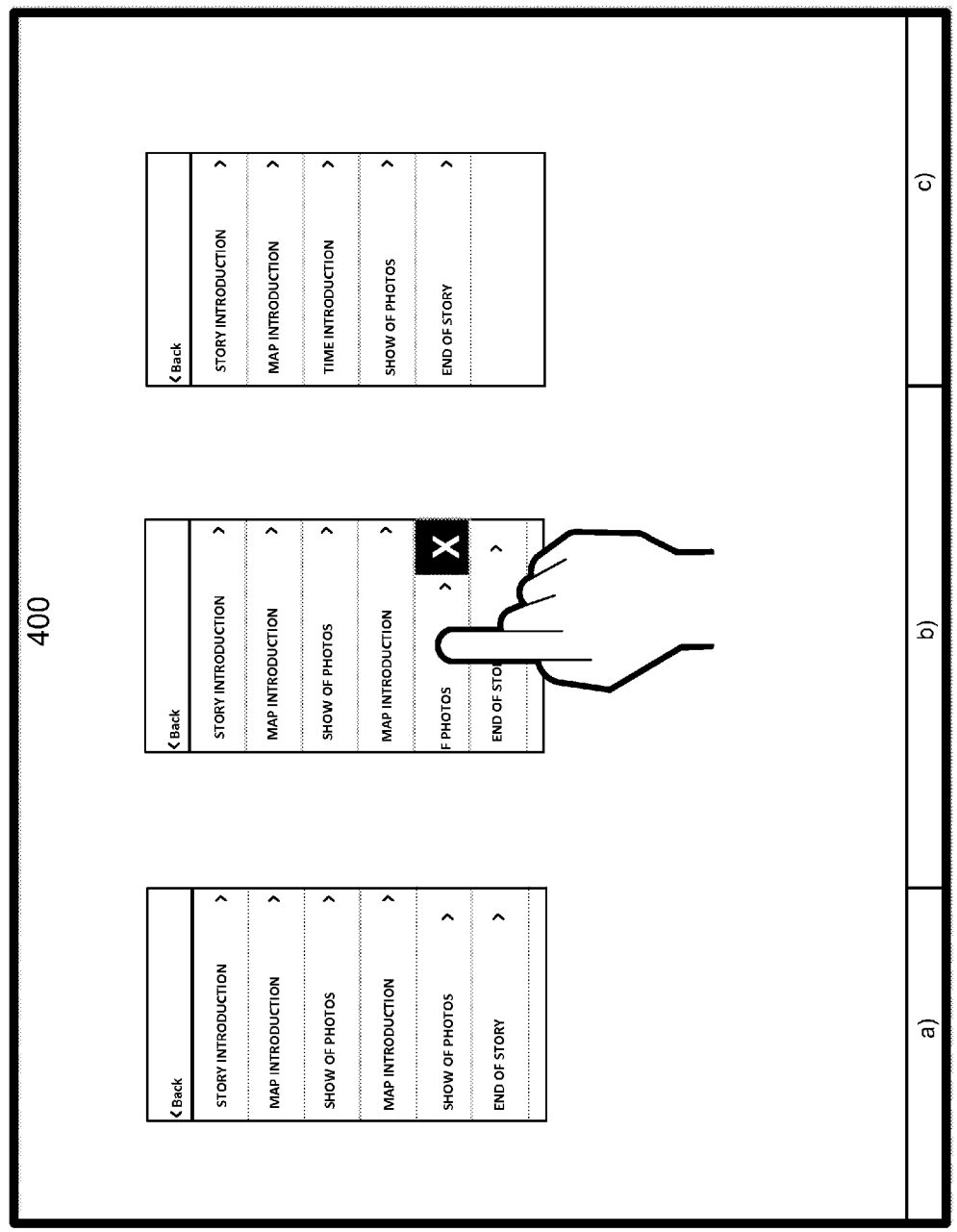
FIG. 4 is a narrative entry deletion method according to an embodiment of the invention.

After playing the story narrative, UI module 188 may allow the user to redefine the timeline by changing texts created automatically for each animation entry or by changing the photos selection carried out automatically by the system 100, for example. FIGS. 2-4 show examples of a user interaction with a UI generated by the UI module 188 and displayed on a touchscreen. FIG. 2 is a photo selection method 200 according to an embodiment of the invention. The UI module 188 may generate a screen where photos are shown organized by date, and where the user may be able to select first (200*a*) and last (200*b*) photos. All photos within the selected time range may be selected automatically, as shown in 200*b*. FIG. 3 is a narrative timeline editing method 300 according to an embodiment of the invention. After the story is built either manually or automatically by the system 100, as described in greater detail below, the user may be able to edit all timeline texts (300*a*) and also change the selection of photos carried out automatically by the application (300*b*). FIG. 4 is a narrative entry deletion method 400 according to an embodiment of the invention. The user may be able to view items in the narrative (400*a*), select one or more for deletion (400*b*), and view the resulting narrative after deletion (400*c*). If the User deletes an entire show of photos entry and that entry is between separators (introduction, map, calendar, and/or end), the user may be prompted to refactor the story, and the entire dataset associated with the deleted entry may be removed from the clustering process. A new story may be created and shown to the user.

Figure 5:
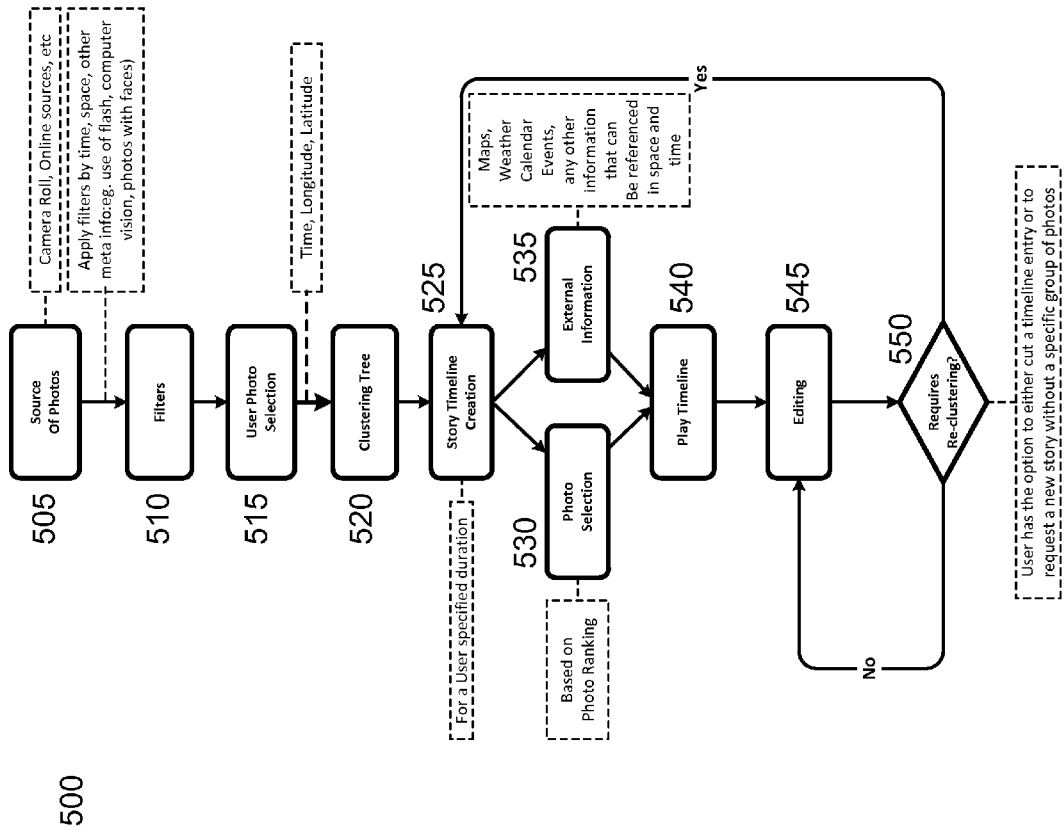
FIG. 5 is a user-defined narrative generation method according to an embodiment of the invention.

FIG. 5 is a user-defined narrative generation method 500 according to an embodiment of the invention. A photo source may be identified 505 by UI module 188 (e.g., locally stored photos in device 100 memory 140, photos available from a remote server via network 10, etc.). This may be done by user selection or automatic suggestion by UI module 188. UI module 188 may apply any filters selected by the user and/or specified by default 510 (e.g., time, space, use of flash, computer vision, face recognition, and/or other meta data) and show the photos to the user. UI module 188 may receive user selections of photos for inclusion in the narrative 515. Clustering module 190 may perform clustering 520 (e.g., by employing the algorithms described above). Narrative module 192 may use the output of clustering module 190 to create a story timeline 525. Ranking module 194 may perform photo selection 530 to select photos in the timeline, and representation module 198 may identify external information that may be used to enhance the narrative 535. UI module 188 may display the resulting timeline for the user's review 540. UI module 188 may accept any user changes 545 for incorporation into the final narrative. Clustering module 190 may analyze the changes to determine whether re-clustering is required 550. If so, the photos may be re-clustered by clustering module 190, and processes 545-545 may be repeated. If not, the finished narrative may be produced, and may be viewed, saved, shared, etc. by the user via UI module 188.

Automatic Selection of Dataset

Automatic stories may be created with no intervention from the user. For example, automatic stories may be built based on a plurality of criteria ranging from simple criteria like "last week recap", "last month recap", "last year recap", to more complex ones that use statistical criteria to track relevant stories in a user's plurality of photos independently of their source.

Dataset Filters

Story tracking may start by the automatic selection module 196 defining a set of filters that may be applied to select a set of photos either isolated or combined. The final result may depend on the order in which filters are applied. The following are example filters that may be used:

Time range: This filter may define an initial and a final date, and photos may be selected if date taken is within the specified range.

Calendar Events: This filter may select photos in specific dates like weekends, Christmas, Easter, and/or many others dependent on culture.

Most Frequent Location: This filter may use latitude and longitude meta-information to compute the statistical mode of both latitude and longitude. After that, photos in a predefined neighborhood threshold may be selected and photos outside the threshold may be excluded.

Distant Location: This filter may use latitude and longitude and may also calculate most frequent location as a reference point. In a second step it may produce two vectors for latitude and longitude with the distance from most frequent location. Finally, it may select photos with a location that crosses a predefined percentile in both latitude and longitude variables.

Following filter application, clustering may be performed as described above. Specifically, clustering may be performed by time, space, or space-time tree.

For clustering by time, a photo dataset variable date may be used to apply a clustering method like the well-known mean shift algorithm. A group may then be selected either randomly or with a predefined index that may have been defined by an external story tracking criteria. For example, if this filter is jointly applied with a Distant Location filter, it can be used to track a user's distant trips.

For clustering by space, photo dataset variables latitude and longitude may be used to apply a clustering method like the mean shift algorithm. As in the clustering by date filter, a group may then be selected either randomly or with a predefined index.

For clustering by space-time tree, the same clustering method used to build the skeleton of a user's stories may be applied to track stories with no user intervention. This filter may use both time and space variables latitude and longitude and may build a clustering tree as described in the clustering description above.

After the tree is defined, the next step may be to select a node of the tree. The selection of this node may be made according to one or a plurality of criteria such as the following:

Select a node randomly from the set of nodes that follow Space/Time story rules (as discussed above);

Select a leaf node randomly and search the tree upstream for a node that produces j consecutive Space/Time isolations (as discussed above). For example, if j=2, it means that children of parent node are isolated in Space and Time and the same for is true for the parent of parent.

Filter Examples

In one example, a user may want to create stories about their trips. This can be carried out by applying first Distant Location Filter followed by Cluster By time one. The first filter may select photos that are statistically distant from most frequent location, which may be very likely to be the user's home. After that, by applying Clustering by Time, candidate trips may be isolated and may be shown to the user by selecting one randomly.

Space/Time stories may represent a sequence where the user traveled from one place to the other and may be relevant to the users. These types of stories may be tracked by applying Time Range filter in a first step to confine the search to a specific period and applying Clustering by Space/Time Tree in a second step.

In another example, a user may have a house where he lives and a second one for the weekends. It may be likely that this user will have photos taken in these two locations over time, and that the stories happening in each house may reflect two different aspects of the user's life (e.g., daily life vs. vacation). A possible way to isolate these locations may be to apply "Clustering by Space" and then using each cluster dataset as a source for a trial story.

Accepting an Automatic Story

After defining a trial dataset to create a story, sets of criteria may be applied to validate the dataset. If the dataset fails to meet one or more of the criteria, the dataset may not be used. For example, a minimum number of records may be required. If dataset photo count is below a predefined minimum record threshold, the dataset may be rejected.

An accepted dataset may be formed into a candidate story as described above. A candidate story may be analyzed by applying a set of filters that assess it according to specific criteria. If the story fails to meet one or more of the criteria, the story may be rejected. Some example filters may be as follows:

If first node does not produce a Space/Time story, story is rejected;

If a predefined number of leaf nodes is not reached, the story may not have enough variability and, thus, it is rejected;

If a predefined number of levels is not reached, the story may not represent a specific duration and, thus, it is rejected.

Figure 6:
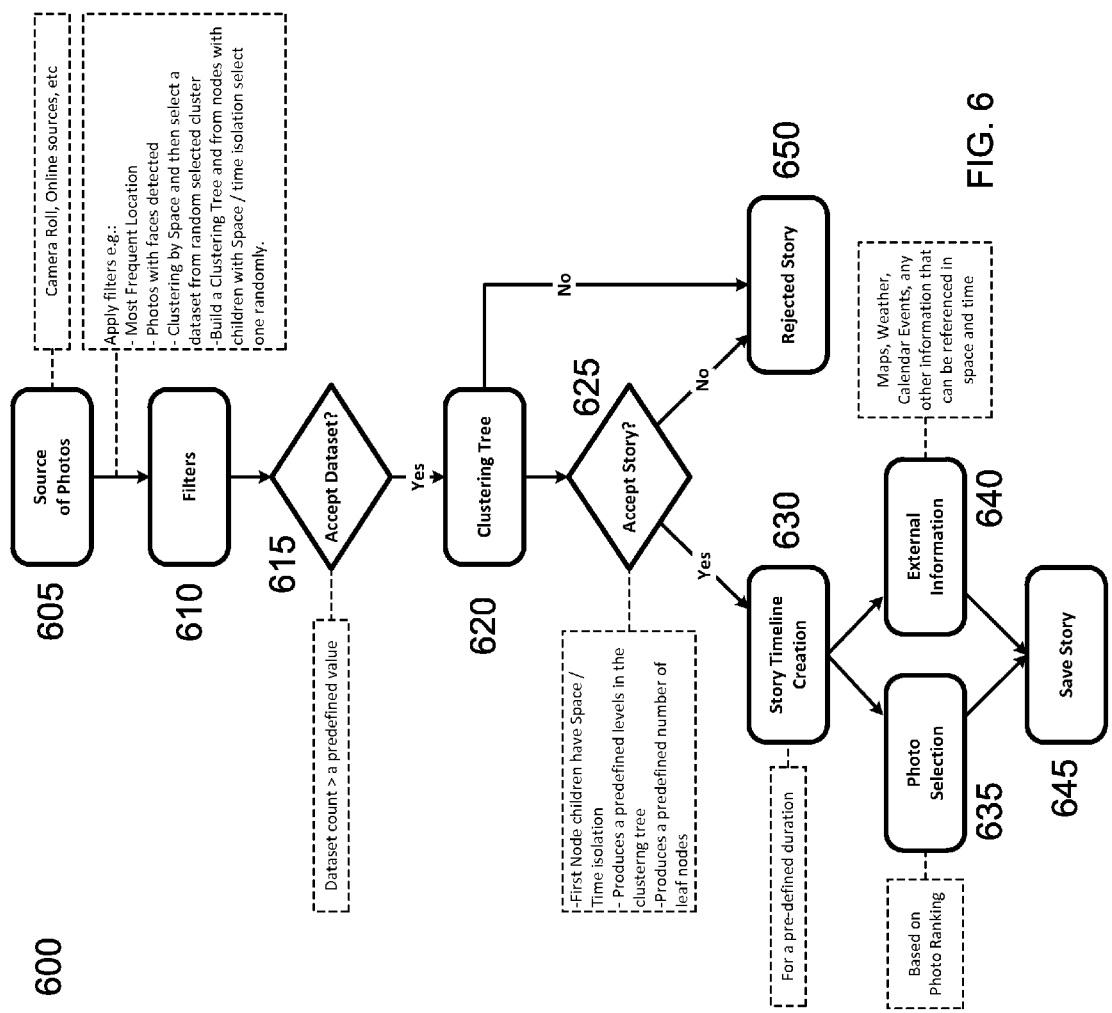
FIG. 6 is an automatic narrative generation method according to an embodiment of the invention.

FIG. 6 is an automatic narrative generation method according to an embodiment of the invention. A photo source may be identified 605 by automatic selection module 196 (e.g., locally stored photos in device 100 memory 140, photos available from a remote server via network 10, etc.). Automatic selection module 196 may apply any filters selected by the user and/or specified by default 610 (e.g., most frequent location, face recognition, clustering by space with dataset selected from each cluster, random selection, etc.). Automatic selection module 196 may decide whether to accept the resulting dataset 615 (e.g., when the dataset count is above a threshold value as described above). If the dataset does not meet the criteria, it may be rejected 650. If the dataset is accepted, clustering module 190 may perform clustering 620 (e.g., by employing the algorithms described above). Automatic selection module 196 may decide whether to accept the resulting story 625 (e.g., accepting the story if it meets criteria such as those described above). If the story does not meet the criteria, it may be rejected 650. If the story is accepted, narrative module 192 may use the output of clustering module 190 to create a story timeline 630. Ranking module 194 may perform photo selection 635 to select photos in the timeline, and representation module 198 may identify external information that may be used to enhance the narrative 640. The finished narrative may be produced and saved 645, and may be subsequently viewed, edited, saved, shared, etc. by the user via UI module 188.

Illustrative Example

The following example may use the systems and methods described above to produce a narrative. A user may live in New York City and travel on holiday to London for a 6 day journey where she always stays in a friend's house on the outskirts. The user may take some photos at JFK airport before catching the plane to start her vacation. Every day in London the user may take a train downtown and take pictures from the most relevant locations she visits, with some places being visited more than once in the trip. Every day she may return to her friend's house at night. In two different days she has lunch and dinner respectively with her friend's family and, again, some photos may be taken. Upon returning home, the user may take some pictures again in NY in the same airport where the journey began. Table 2 represents the entire dataset.

TABLE 2

Photo dataset with times and locations

| Photo | Datetime | Latitude (°) | Longitude (°) | Country |
|---|---|---|---|---|
| 1 | Sep. 23, 2012 6:24:00 AM | 40.643583 | −73.782464 | NY, JFK |
| 2 | Sep. 23, 2012 6:24:33 AM | 40.643797 | −73.781378 | NY, JFK |
| 3 | Sep. 24, 2012 1:44:35 PM | 51.5195 | −0.0575 | London, downtown |
| 4 | Sep. 25, 2012 3:00:44 PM | 51.501 | −0.1248333333 | London, downtown |
| 5 | Sep. 25, 2012 3:08:28 PM | 51.501 | −0.1231666667 | London, downtown |
| 6 | Sep. 25, 2012 3:08:30 PM | 51.5011666667 | −0.1245 | London, downtown |
| 7 | Sep. 25, 2012 3:08:35 PM | 51.5011666667 | −0.1245 | London, downtown |
| 8 | Sep. 25, 2012 3:08:40 PM | 51.5011666667 | −0.1245 | London, downtown |
| 9 | Sep. 25, 2012 3:09:04 PM | 51.5011666667 | −0.124 | London, downtown |
| 10 | Sep. 26, 2012 12:58:01 PM | 51.429439 | −0.042342 | London, Friend's House |
| 11 | Sep. 26, 2012 3:21:14 PM | 51.4958333333 | −0.1766666667 | London, downtown |
| 12 | Sep. 26, 2012 4:15:07 PM | 51.4968333333 | −0.1775 | London, downtown |
| 13 | Sep. 26, 2012 5:55:07 PM | 51.5135 | −0.1313333333 | London, downtown |
| 14 | Sep. 27, 2012 3:17:43 PM | 51.5013333333 | −0.133 | London, downtown |
| 15 | Sep. 27, 2012 3:19:45 PM | 51.5015 | −0.133 | London, downtown |
| 16 | Sep. 27, 2012 3:43:54 PM | 51.5013333333 | −0.1281666667 | London, downtown |
| 17 | Sep. 28, 2012 3:31:34 PM | 51.5096666667 | −0.0985 | London, downtown |
| 18 | Sep. 28, 2012 3:40:25 PM | 51.5125 | −0.0983333333 | London, downtown |
| 19 | Sep. 28, 2012 4:52:59 PM | 51.5125 | −0.1268333333 | London, downtown |
| 20 | Sep. 28, 2012 8:07:47 PM | 51.429138 | −0.042632 | London, Friend's House |
| 21 | Sep. 28, 2012 8:10:47 PM | 51.429138 | −0.042632 | London, Friend's House |
| 22 | Sep. 28, 2012 8:38:06 PM | 51.429733 | −0.042729 | London, Friend's House |
| 23 | Sep. 28, 2012 9:23:21 PM | 51.4293333333 | −0.042729 | Friend's House |
| 24 | Sep. 28, 2012 9:23:22 PM | 51.429733 | −0.042729 | London, Friend's House |
| 25 | Sep. 28, 2012 9:23:23 PM | 51.4293333333 | −0.042600 | London, Friend's House |
| 26 | Sep. 29, 2012 00:07:28 AM | 40.642690 | −73.783195 | NY, JFK |
| 27 | Sep. 29, 2012 00:12:06 AM | 40.644383 | −73.781511 | NY, JFK |

Clustering

Before applying the clustering method, clustering module 190 may transform data with a Mercator Projection to guarantee that the distance between points is not affected by their location in the world. Although some changes might occur according to the specific implementation and/or dataset, an example tree 800 produced by the dataset of Table 2 is shown in FIG. 8.

First clustering level may produce three clusters completely isolated in time but not in space. If they are chronologically organized, a first cluster (1.1) may include NY photos at the beginning of the journey, a second cluster (1.2) may include photos from London, and a third cluster (1.3) may include photos from NY taken upon return. Despite being in the same geography as 1.1, 1.3 is isolated from previous cluster 1.2 both in space and time and therefore respects space/time classification to form a separate cluster from 1.1.

The next step to build a tree is to tentatively apply clustering again to each of the three data sets (1.1, 1.2, and 1.3). Both 1.1 and 1.3 are very isolated in space and time with just a few photos and thus may not be divided and may become leaf nodes. 1.2, however, produces two clusters, a first with photos in London's downtown (1.2.1) and a second one in the friend's house on the outskirts of town (1.2.2). Because the user took photos in two different days in the same geography (friend's house) and photos downtown, clustering may isolate these two geographies. Clustering may not produce, however, a set of clusters with a space/time sequence. Clusters 1.2.1 and 1.2.2 may be separated with time isolation only.

Downtown traveling may have produced a complex geographic "spaghetti" with very close locations being visited more than once scattered over time. However, photos were taken during the day with a night gap in between and, thus, 1.2.1 may produce clusters isolated in time with each cluster representing a specific day. Friend's house pictures were taken in day 2 and in the last night before catching the plane back home in the next day. Given that geography is the same, 1.2.1 may be divided by time.

Timeline Creation

In this example the narrative may be enhanced with maps and location names by consuming public services like Google Maps or Apple Maps. Furthermore, in this example the user specified 30 seconds for the narrative.

Narrative module 192 may apply the algorithm to create a timeline to represent the story starting with the simpler scenario (i.e., solely representing the first node (1)), and then the algorithm may try to delegate animations to the first node's children and check if some representation criteria are met in each individual child. In branches with approved animation delegation, the animation propagation may continue down the tree until a leaf node is reached or until at least one of the representation criteria not matched.

First Iteration

Origin node may have an associated timeline with an introduction, a reference map, a slideshow of photos, and an end of story.

Assume the following predefined fixed durations:

SI=4 seconds;

GI=2 seconds;

$SE_{Guess}$=1 seconds.

In this scenario there are 23 (30−(4+2+1)) seconds to represent photos and 3 child nodes to be reflected. Representation time may be distributed to define how many photos will be shown per child cluster and the animation duration of each photo. If it is assumed that each photo has duration of 2 seconds and that each node should have a minimum of 2 photos to be represented, the following distribution may result:

TABLE 3

Photo count per cluster

| Node | Photo Count | Total Duration (s) |
|---|---|---|
| 1.1 | 2 | 4 |
| 1.2 | 7.5 | 15 |
| 1.3 | 2 | 4 |

As shown, may be impossible to obtain an integer number of photos to represent node 1.2, and thus corrections may be made. For example, narrative module 192 may change each photo animation's duration proportionally or may correct elsewhere (e.g., in the end animation). In this example, the second option may be chosen, and the end animation is increased by 1 second. At the current stage of the process, the accepted timeline may be represented as follows:

TABLE 4 first accepted timeline

| Animation Entry | Duration (s) | Notes |
|---|---|---|
| Introduction | 4 | |
| Map | 2 | |
| Photo Slide Show 1.1 | 4 | 2 Photos |
| Photo Slide Show 1.2 | 14 | 7 Photos |
| Photo Slide Show 1.3 | 4 | 2 Photos |
| End | 2 | |

Second Iteration

Animation may be tentatively propagated to the next level of the clustering tree and nodes 1.1, 1.2, and 1.3 may be responsible for their own representation. However, node 1 may continue to be responsible for the Introduction, for the Map that includes all 1.1, 1.2, and 1.3 geographies and also for the End that may assume its original value of 1 second. Therefore, 23 seconds may be made available to nodes 1.1, 1.2, and 1.3 to represent themselves, and the 23 second representation time may be divided among the nodes.

Each delegated node may have a map to localize it in more detail and a photo slide show. Assuming that a map animation duration in a second level is the same as in the first and that the minimum number of photos is again 2 with a duration of 2 seconds each, time may distributed as follows:

| Node | Total Duration (s) | Total Duration (s) |
|---|---|---|
| 1.1 | 6 | 2 + 2 × 2 |
| 1.2 | 11 | 2 + Time left |
| 1.3 | 6 | 2 + 2 × 2 |
| Total | 23 | |

There may be 9 seconds to represent photos in node 1.2, and it is assumed that photos should have animation of 2, which only allows the representation of 4 in 8 seconds. The remaining second may be added to the end animation duration.

Node 1.2 has 4 photos to show and it has 2 children with a proportion of 21:7 photos, which gives 3 photos to represent cluster 1.2.1 and 1 photo to represent 1.2.2. However, each cluster is being forced to have at least 2 photos, giving a 2:2 proportion. After this last attribution, the following timeline may be successfully built:

| Animation Entry | Duration (s) | Notes |
|---|---|---|
| Introduction (1) | 4 | |
| Map (1) | 2 | |
| Map (1.1) | 2 | |
| Photo Slide Show 1.1 | 4 | 2 Photos |
| Map (1.2) | 2 | |
| Photo Slide Show 1.2.1 | 4 | 2 Photos |
| Photo Slide Show 1.2.2 | 4 | 2 Photo |
| Map (1.3) | 2 | |
| Photo Slide Show 1.3 | 4 | 2 Photos |
| End | 2 | |
| Total | 30 | |

Third Iteration

Nodes 1.1 and 1.3 have no children, which means that their sub-timeline is defined. Narrative module 192 may determine whether node 1.2 can delegate animation to its children 1.2.1 and 1.2.2. The 1 second that was added to the end animation may be tentatively recovered, and nodes 1.2.1 and 1.2.2 may have a total of 7 seconds. Each node may have a map and at least two photos with a minimum duration of 12 seconds, which is more than the available delegation time. Thus, the last accepted timeline may be selected as the timeline to represent the tree in 30 seconds.

While various embodiments have been described above, it should be understood that they have been presented by way of example and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments.

In addition, it should be understood that any figures that highlight the functionality and advantages are presented for example purposes only. The disclosed methodology and system are each sufficiently flexible and configurable such that they may be utilized in ways other than that shown.

Although the term "at least one" may often be used in the specification, claims and drawings, the terms "a", "an", "the", "said", etc. also signify "at least one" or "the at least one" in the specification, claims and drawings.

Finally, it is the applicant's intent that only claims that include the express language "means for" or "step for" be interpreted under 35 U.S.C. 112(f). Claims that do not expressly include the phrase "means for" or "step for" are not to be interpreted under 35 U.S.C. 112(f).

What is claimed is:

1. A system for transforming media elements into a narrative comprising: a processor;
   a memory in communication with the processor;
   a clustering module in communication with the processor and the memory, the clustering module configured to:
   receive a dataset comprising a plurality of media elements each comprising metadata; and
   organize the plurality of media elements into a plurality of clusters based on the metadata, the plurality of clusters being organized into a clustering tree; and
   a narrative module in communication with the processor and the memory, the narrative module configured to create a narrative comprising a plurality of the media elements arranged into a narrative sequence, the narrative sequence being structured according to the clustering tree and for a predetermined duration, the narrative sequence comprising a story introduction for introducing the narrative, a geographic introduction for contextualizing a cluster, a time introduction for identifying a cluster time period, a show of media elements for representing the media elements, and a story end,
   wherein the narrative module is configured to create the narrative sequence according to an algorithm comprising specific durations for at least the following entries:
   story introduction (SI),
   geographic introduction (GI),
   time introduction (TI),
   show of photos, with a minimum duration for photo representation ($P_{min}$), and
   story end, given ($SE_{guess}$), where
   T is a total duration of the narrative,
   N is a total number of media elements in the dataset, and
   the algorithm produces the following result:

$$T > SI + GI + TI + P_{min} + SE_{guess}.$$

2. The system of claim 1, wherein:
   the metadata for each media element comprises information about a time at which the media element was created, information about a location at which the media element was created, or a combination thereof; and
   the clustering module is configured to organize the plurality of media elements into the plurality of clusters based on:
   time, wherein the produced clusters are isolated in time but not in space; space, wherein the produced clusters are isolated in space but not in time;
   space/time, wherein the produced clusters comprise a sequence of
   clusters organized so that consecutive clusters are isolated in space and time; or a combination thereof.

3. The system of claim 1, wherein the clustering module is configured to organize the plurality of clusters into the clustering tree by:
   applying a clustering algorithm to the dataset to produce at least one first cluster that is a subset of the dataset;
   applying the same clustering algorithm to the at least one first cluster to produce at least one child cluster that is a subset of the at least one first cluster; and
   applying the same clustering algorithm to each child, until the clustering algorithm ceases to divide the clusters into child clusters that are subsets of other clusters.

4. The system of claim 1, wherein:
   the narrative sequence structure includes a fixed length of time for display of the narrative sequence; and
   the clustering module is configured to apportion the fixed length of time among each cluster according to at least one of the following criteria:
   proportional to a number of media elements present in each child cluster of the cluster;
   proportional to a number of clusters that are direct children or children of children of the cluster;
   proportional to a number of media elements including a detected face;
   proportional to a social media engagement level associated with at least one media element;
   proportional to at least one external data element associated with at least one media element; and
   a weighted average of at least two of the criteria.

5. A system for transforming media elements into a narrative comprising: a processor;
   a memory in communication with the processor;
   a clustering module in communication with the processor and the memory, the clustering module configured to:
   receive a dataset comprising a plurality of media elements each comprising metadata; and
   organize the plurality of media elements into a plurality of clusters based on the metadata, the plurality of clusters being organized into a clustering tree; and
   a narrative module in communication with the processor and the memory, the narrative module configured to create a narrative comprising a plurality of the media elements arranged into a narrative sequence, the narrative sequence being structured according to the clustering tree and for a predetermined duration,
   wherein the narrative module is configured to create the narrative sequence by:
   tentatively distributing representation time from a fixed amount of time down the clusters in the tree by:
   defining a first trial timeline using the first cluster of the tree and the entire dataset of media elements, the first trial timeline comprising the following sequence: an introduction with a predefined duration;
   a geographic introduction with a predefined duration; and
   a show of media elements, wherein media elements are selected proportionally to the number of photos in each child cluster if a total number of media elements to be shown is greater than a number of child clusters in the tree;
   delegating animation to the child clusters according to the following rules: when the first cluster has at least two children, defining a second trial timeline comprising a story introduction, a geographic introduction, tentatively delegated entries, and an end;
   defining a sub-timeline for each of the at least two children;
   determining whether a minimum number of media elements for each of the children can be shown within the fixed amount of time, based on a specified minimum number of media elements per cluster and a minimum duration for each media elements;
   when the first cluster has no children, designating the first trial timeline as an accepted timeline;
   when the first cluster has at least two children and the minimum number of media elements can be shown, accepting the second trial timeline as the accepted timeline; and
   when the minimum number of media elements cannot be shown, directly selecting at least one media element for inclusion in the accepted timeline.

6. The system of claim 1, further comprising an automatic selection module in communication with the processor and the memory, the automatic selection module configured to select the dataset from a set of media elements by applying at least one filter to the plurality of data elements.

7. The system of claim 6, wherein the at least one filter sorts the plurality of data elements based on time, location, face recognition, random selection, or a combination thereof.

8. The system of claim 1, further comprising a user interface (UI) module in communication with the processor and the memory, the UI module configured to:
receive at least one edit to the narrative sequence;
cause the narrative sequence to be displayed;
receive at least one filter selection and select the dataset from a set of media elements by applying the at least one filter to the plurality of data elements; or
a combination thereof.

9. The system of claim 8, wherein the at least one filter sorts the plurality of data elements based on time, location, face recognition, random selection, or a combination thereof.

10. The system of claim 1, further comprising a ranking module in communication with the processor and the memory, the ranking module configured to:
determine a ranking for the plurality of media elements in the dataset based on metadata of the plurality of media elements;
wherein the narrative module is further configured to select the plurality of the media elements arranged into the narrative sequence based on the ranking.

11. The system of claim 10, wherein the ranking is based on face recognition, histogram analysis, user selection, or a combination thereof.

12. The system of claim 1, further comprising a representation module in communication with the processor and the memory, the representation module configured to identify external information relevant to the narrative sequence;
wherein the narrative module is further configured to incorporate the external information into the narrative sequence.

13. The system of claim 12, wherein the external information comprises a map, weather information, social network activity, a calendar event, or a combination thereof.

14. The system of claim 1, wherein the media elements comprise photos.

15. The system of claim 1, wherein the narrative sequence comprises a visual presentation displaying the plurality of the media elements included in the narrative sequence in a defined order over a defined duration to represent the narrative.

16. A method for transforming media elements into a narrative comprising:
receiving, with a clustering module in communication with a processor and a memory, a dataset comprising a plurality of media elements each comprising metadata;
organizing, with the clustering module, the plurality of media elements into a plurality of clusters based on the metadata, the plurality of clusters being organized into a clustering tree; and
creating, with a narrative module in communication with the processor and the memory, a narrative comprising a plurality of the media elements arranged into a narrative sequence, the narrative sequence being structured according to the clustering tree and for a predetermined duration, the narrative sequence comprising a story introduction for introducing the narrative, a geographic introduction for contextualizing a cluster, a time introduction for identifying a cluster time period, a show of media elements for representing the media elements, and a story end,
wherein the narrative module is configured to create the narrative sequence according to an algorithm comprising specific durations for at least the following entries:
story introduction (SI),
geographic introduction (GI),
time introduction (TI),
show of photos, with a minimum duration for photo representation ($P_{min}$), and
story end, given ($SE_{guess}$), where
T is a total duration of the narrative,
N is a total number of media elements in the dataset, and
the algorithm produces the following result:

$$T > SI + GI + TI + P_{min} + SE_{guess}.$$

17. The method of claim 16, wherein:
the metadata for each media element comprises information about a time at which the media element was created, information about a location at which the media element was created, or a combination thereof; and
organizing the plurality of media elements into the plurality of clusters is based on:
time, wherein the produced clusters are isolated in time but not in space;
space, wherein the produced clusters are isolated in space but not in time;
space/time, wherein the produced clusters comprise a sequence of clusters organized so that consecutive clusters are isolated in space and time; or a combination thereof.

18. The method of claim 16, wherein organizing the plurality of clusters into the clustering tree comprises:
applying a clustering algorithm to the dataset to produce at least one first cluster that is a subset of the dataset;
applying the same clustering algorithm to the at least one first cluster to produce at least one child cluster that is a subset of the at least one first cluster; and
applying the same clustering algorithm to each child, until the clustering algorithm ceases to divide the clusters into child clusters that are subsets of other clusters.

19. The method of claim 16, wherein the narrative sequence structure includes a fixed length of time for display of the narrative sequence, further comprising apportioning, with the clustering module, the fixed length of time among each cluster according to at least one of the following criteria:
proportional to a number of media elements present in each child cluster of the cluster;
proportional to a number of clusters that are direct children or children of children of the cluster;
proportional to a number of media elements including a detected face; proportional to a social media engagement level associated with at least one media element;
proportional to at least one external data element associated with at least one media element; and
a weighted average of at least two of the criteria.

20. A method for transforming media elements into a narrative comprising:
receiving, with a clustering module in communication with a processor and a memory, a dataset comprising a plurality of media elements each comprising metadata;

organizing, with the clustering module, the plurality of media elements into a plurality of clusters based on the metadata, the plurality of clusters being organized into a clustering tree; and creating, with a narrative module in communication with the processor and the memory, a narrative comprising a plurality of the media elements arranged into a narrative sequence, the narrative sequence being structured according to the clustering tree and for a predetermined duration, wherein creating the narrative sequence comprises:

tentatively distributing representation time from a fixed amount of time down the clusters in the tree by:

defining a first trial timeline using the first cluster of the tree and the entire dataset of media elements, the first trial timeline comprising the following sequence:

an introduction with a predefined duration;

a geographic introduction with a predefined duration; and a show of media elements, wherein media elements are selected proportionally to the number of photos in each child cluster if a total number of media elements to be shown is greater than a number of child clusters in the tree;

delegating animation to the child clusters according to the following rules: when the first cluster has at least two children, defining a second trial timeline comprising a story introduction, a geographic introduction, tentatively delegated entries, and an end;

defining a sub-timeline for each of the at least two children; determining whether a minimum number of media elements for each of the children can be shown within the fixed amount of time, based on a specified minimum number of media elements per cluster and a minimum duration for each media elements;

when the first cluster has no children, designating the first trial timeline as an accepted timeline;

when the first cluster has at least two children and the minimum number of media elements can be shown, accepting the second trial timeline as the accepted timeline; and when the minimum number of media elements cannot be shown, directly selecting at least one media element for inclusion in the accepted timeline.

21. The method of claim 16, further comprising selecting, with an automatic selection module in communication with the processor and the memory, the dataset from a set of media elements by applying at least one filter to the plurality of data elements.

22. The method of claim 21, wherein the at least one filter sorts the plurality of data elements based on time, location, face recognition, random selection, or a combination thereof.

23. The method of claim 16, further comprising:

receiving, with a user interface (UI) module in communication with the processor and the memory, at least one edit to the narrative sequence;

causing, with the UI module, the narrative sequence to be displayed;

receiving, with the UI module, at least one filter selection and select the dataset from a set of media elements by applying the at least one filter to the plurality of data elements; or a combination thereof.

24. The method of claim 23, wherein the at least one filter sorts the plurality of data elements based on time, location, face recognition, random selection, or a combination thereof.

25. The method of claim 16, further comprising:

determining, with a ranking module in communication with the processor and the memory, a ranking for the plurality of media elements in the dataset based on metadata of the plurality of media elements;

selecting, with the narrative module, the plurality of the media elements arranged into the narrative sequence based on the ranking.

26. The method of claim 25, wherein the ranking is based on face recognition, histogram analysis, user selection, or a combination thereof.

27. The method of claim 16, further comprising:

identifying, with a representation module in communication with the processor and the memory, external information relevant to the narrative sequence;

incorporating, with the narrative module, the external information into the narrative sequence.

28. The method of claim 27, wherein the external information comprises a map, weather information, social network activity, a calendar event, or a combination thereof.

29. The method of claim 16, wherein the media elements comprise photos.

30. The method of claim 16, wherein the narrative sequence comprises a visual presentation displaying the plurality of the media elements included in the narrative sequence in a defined order over a defined duration to represent the narrative.

* * * * *